United States Patent
Ravin

Patent Number: 5,832,874
Date of Patent: Nov. 10, 1998

[54] PET CARRIER

[76] Inventor: Richard L. Ravin, 187 Morris Turnpike, Randolph, N.J. 07869

[21] Appl. No.: 798,476

[22] Filed: Feb. 10, 1997

[51] Int. Cl.⁶ .................................................. A01K 1/00
[52] U.S. Cl. .......................... 119/496; 224/422; 224/424; 280/204
[58] Field of Search .................... 119/496, 497, 119/453, 771, 784; 224/412, 413, 419, 421, 422, 423, 424, 425, 426; 280/204

[56] References Cited

U.S. PATENT DOCUMENTS

| | | | |
|---|---|---|---|
| D. 227,126 | 6/1973 | Brison | 119/497 |
| 2,459,249 | 1/1949 | Sternad | 280/202 |
| 2,629,527 | 2/1953 | Brown | 224/32 |
| 3,301,448 | 1/1967 | Inoue | 224/32 |
| 3,865,425 | 2/1975 | French | 296/26 |
| 4,003,508 | 1/1977 | Hoops | 224/32 |
| 4,010,880 | 3/1977 | Guillot-Munoz | 119/496 |
| 4,053,091 | 10/1977 | Martelet | 224/424 |
| 4,644,902 | 2/1987 | Doyle | 119/497 |
| 4,736,707 | 4/1988 | Christie | 119/497 |
| 4,977,857 | 12/1990 | Slawinski | 119/497 |
| 5,072,694 | 12/1991 | Haynes | 119/482 |
| 5,113,793 | 5/1992 | Leader | 119/497 |
| 5,170,745 | 12/1992 | Burdette | 119/497 |
| 5,176,102 | 1/1993 | Tracy | 119/497 |
| 5,443,023 | 8/1995 | Saleme | 119/771 |
| 5,479,892 | 1/1996 | Edwards | 119/771 |
| 5,577,646 | 11/1996 | White | 119/496 |

*Primary Examiner*—John L. Wilson
*Attorney, Agent, or Firm*—Weingram & Associates, P.C.

[57] ABSTRACT

A pet carrier is provided which is adapted for use with tandem wheeled vehicles such as bicycles and motorcycles and has an open box like construction with a connecting means located in the back wall for securing a fastening device to a harness on the pet. The pet carrier includes structure to enable quick, easy and secure attachment and detachment from the associated vehicle. The connecting means in the back of the pet carrier enables the pet to be secured in comfort while being carried and transported.

22 Claims, 11 Drawing Sheets

PET CARRIER

BACKGROUND OF THE INVENTION

1. Field of the Invention

This invention relates to detachable pet carriers adapted for engagement with bicycles and motorcycles so as to be completely supported by the bicycle or motorcycle as a trailer.

2. Description of the Related Art

Pet owners desiring to take their pets, especially dogs, along when traveling, in particular, when bicycling have no way to safely and securely transport the pet. If the pet is put in a box or basket on the bicycle, the rider and pet face dangerous situations of the pet jumping around or jumping out; especially when seeing other animals. In the case of a dog, the hazard is the dog may jump around or jar the rider, distracting the rider and possibly upsetting the bicycle. There is the further danger of the animal jumping out of an open-topped carrier resulting in injury or death to the pet.

Various types of carriers have been provided for attachment to moving vehicles but all of these known to me have been relatively large, heavy and expensive, and difficult to maneuver while riding on a bicycle. Further, these carriers have restrained the pet in a manner which is unsafe, inconvenient and uncomfortable to the pet and the rider. For example:

| U.S. Pat. No. | Inventor(s) |
| --- | --- |
| 2,459,249 | Sternad |
| 2,629,527 | Brown |
| 3,301,448 | Inoue |
| 3,865,425 | French |
| 4,003,508 | Hoops |
| 4,010,880 | Guillot-Munoz |
| 4,644,902 | Doyle |
| 4,736,707 | Christie |
| 4,977,857 | Slawinski |
| 5,072,694 | Haynes et al. |
| 5,113,793 | Leader et al. |
| 5,170,745 | Burdette, Jr. |
| 5,176,102 | Tracy |
| DES 227,126 | Brison |

The patents to Sternad, Brown, Inoue and Hoops disclose divices which are mounted to bikes, motorcycles or tricycles.

The patent to French discloses a trailer which is towed behind a vehicle.

The patents to Guillot-Munoz, Doyle, Christie, Slawinski, Haynes et al, Leader et al, Burdette, Jr, Tracy and Brison, disclose apparatus for carrying the pets, which apparatus are not constructed for being mounted to a bike and generally rely on hooks, straps and cross pieces for mounting the carrier for transport. Brison is directed to the design or appearance of a pet case.

OBJECTS AND SUMMARY OF THE INVENTION

The general object of the invention is to overcome the foregoing disadvantages of pet carriers and to provide a sturdy, safe pet carrier which can be readily mounted on a bicycle, motorcycle or other such type vehicle, or attached as a trailer.

A further object of the invention is to provide a pet carrier which permits the pet to be securely transported and which allows the pet some freedom of movement but does not permit such latitude in movement so as to upset the balance of the bicycle when in motion or permit the pet from jumping or falling out of the carrier.

Yet another object of the invention is to provide a pet carrier which allows the pet to sit in an upright position with its head exposed for maximum comfort and. visibility while at the same time restraining the pets body in the carrier. A pet carrier is provided which is adapted for use with tandem wheeled vehicles such as bicycles and motorcycles and has an open box like construction with a connecting means located in the back wall for securing a fastening device to a harness on the pet. The pet carrier includes structure to enable quick, easy and secure attachment and detachment from the associated vehicle. The connecting means in the back of the pet carrier enables the pet to be secured in comfort while being carried and transported.

The foregoing and other features and advantages of the invention will become apparent from the following drawings and description of the invention, wherein:

DETAILED DESCRIPTION OF THE PREFERRED EMBODIMENTS

A preferred embodiment is illustrated by way of the example only in the accompanying drawings forming a part of this specification, and in which similar reference characters designate corresponding parts throughout the several figures of the drawings.

Referring to the embodiment shown in FIGS. 1, 2, 4 and 9 we see a carrier for pets generally indicated at 20 having a bottom surface 22 with a front wall 24 a rear wall, 26 and left and right side walls looking from the front 30 and 32 respectively. Combing 36 is formed at the top of all of the walls as a cushioning and strengthening member. At the back wall of the pet carrier is a traveler attached to the wall, generally indicated at 40, which has a plurality of horizontal bars 42A, B, C, D and E, as shown, which are connected to vertical bars 44A and B, which in turn are connected to the back walls by cable ties which consist of U shaped members 46A, B, C and D extending around the vertical bars at the four corners of the travelers which pass through washers 48A, B, C and D respectively and are fastened by nuts 52A, B, D and D connected to the threaded ends of the U shaped members not shown.

Figure 5:
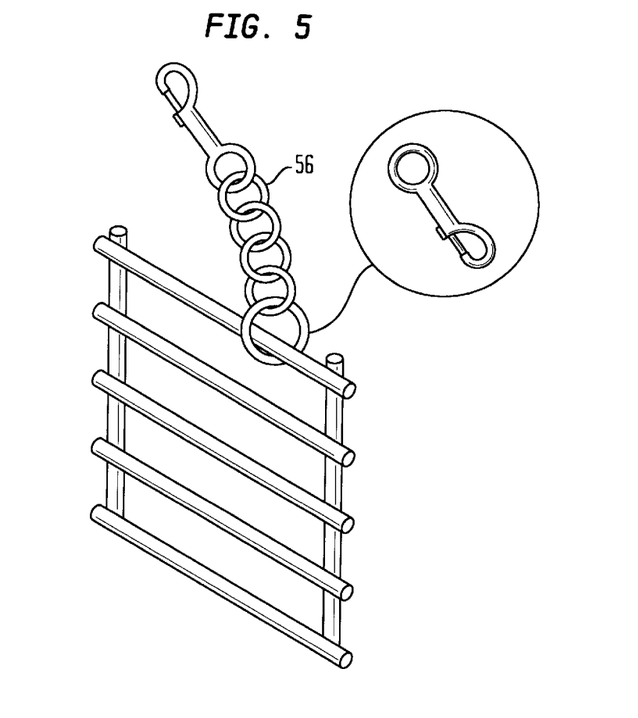
FIG. 5 is perspective view of a part of the pet carrier shown in FIG. 1.

As shown in FIG. 5, a double clasp connection 56 is secured to one of the horizontal bars. The bar in question can be selected by the size of the pet that is to be held in the carrier. As shown in FIG. 5, the double clasp member has a key ring type of removable attaching member at one end and a quick disconnect type displaceable tongue type member at the other end. Needless to say many other types of double clasp means having a clasp at one end and attaching means at the other end may be used. So, for example, two identical displaceable tongue devices could be used with the chain as shown in the circle portion exploded in FIG. 5 or alternatively a strap connection could be used.

Figure 1:
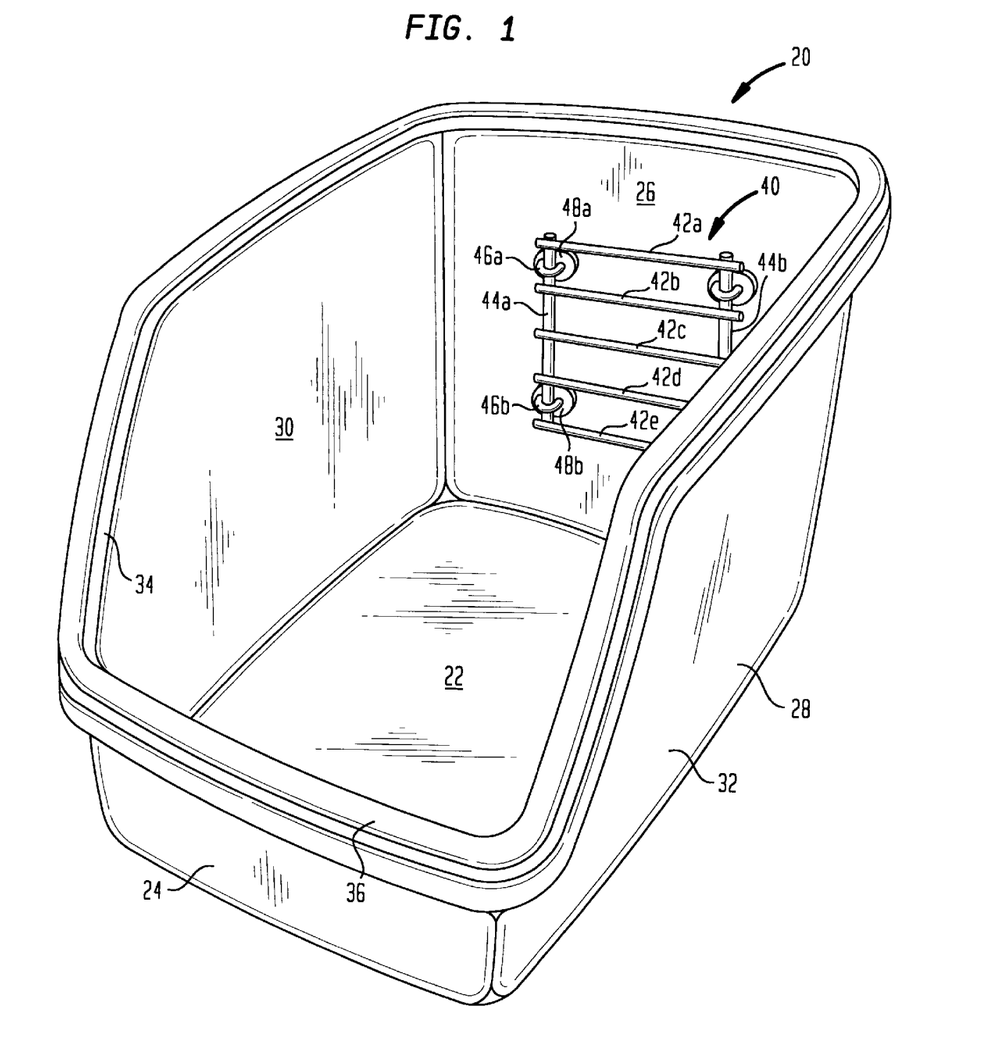
FIG. 1 is a perspective view from the upper right of a pet carrier built in accordance with the teachings of the present invention.
Figure 2:
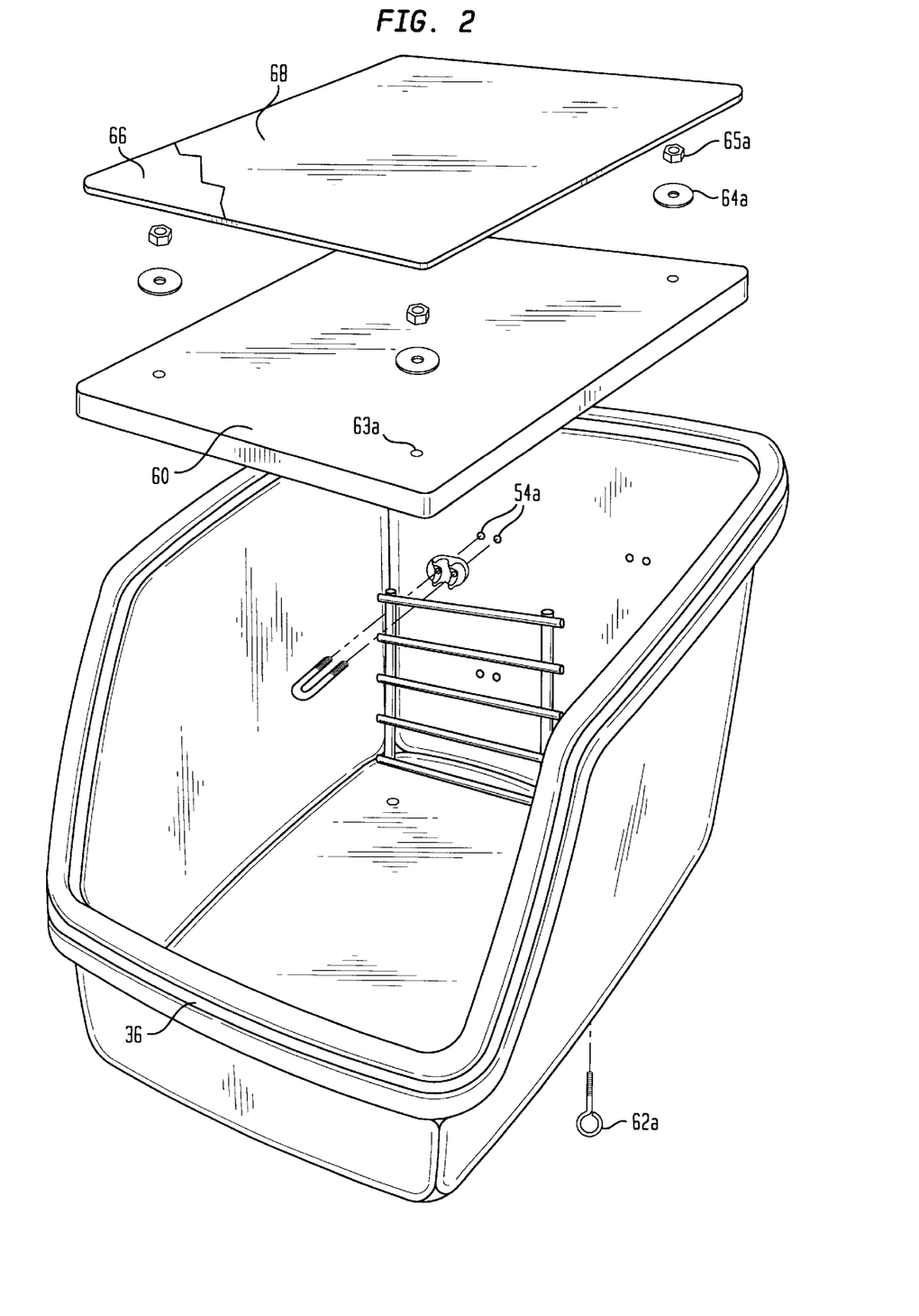
FIG. 2 is an exploded view of the pet carrier shown in FIG. 1.

The pet carrier has a plurality of holes in the back wall to enable the U shaped members to pass through the back wall for fastening the traveler. There are four pairs of holes generally indicated at 54A, B. C and D respectively.

The pet carrier, as we mentioned, has padding for the pet, which includes the combing 36, and a section of cushioning 66, which is covered, as shown, by a water proof cover 68, which can be easily washed.

A stiffening member 60, is positioned in the bottom of the pet carrier and is held in place by means of a series of eye bolts at the corners 62A, B, C and D respectively which pass through passages in the stiffening member 63A, B, C and D respectively and which are secured by means of washers 64A, B, C and D respectively, with appropriate nuts 65A, B, C and D.

Figure 4:
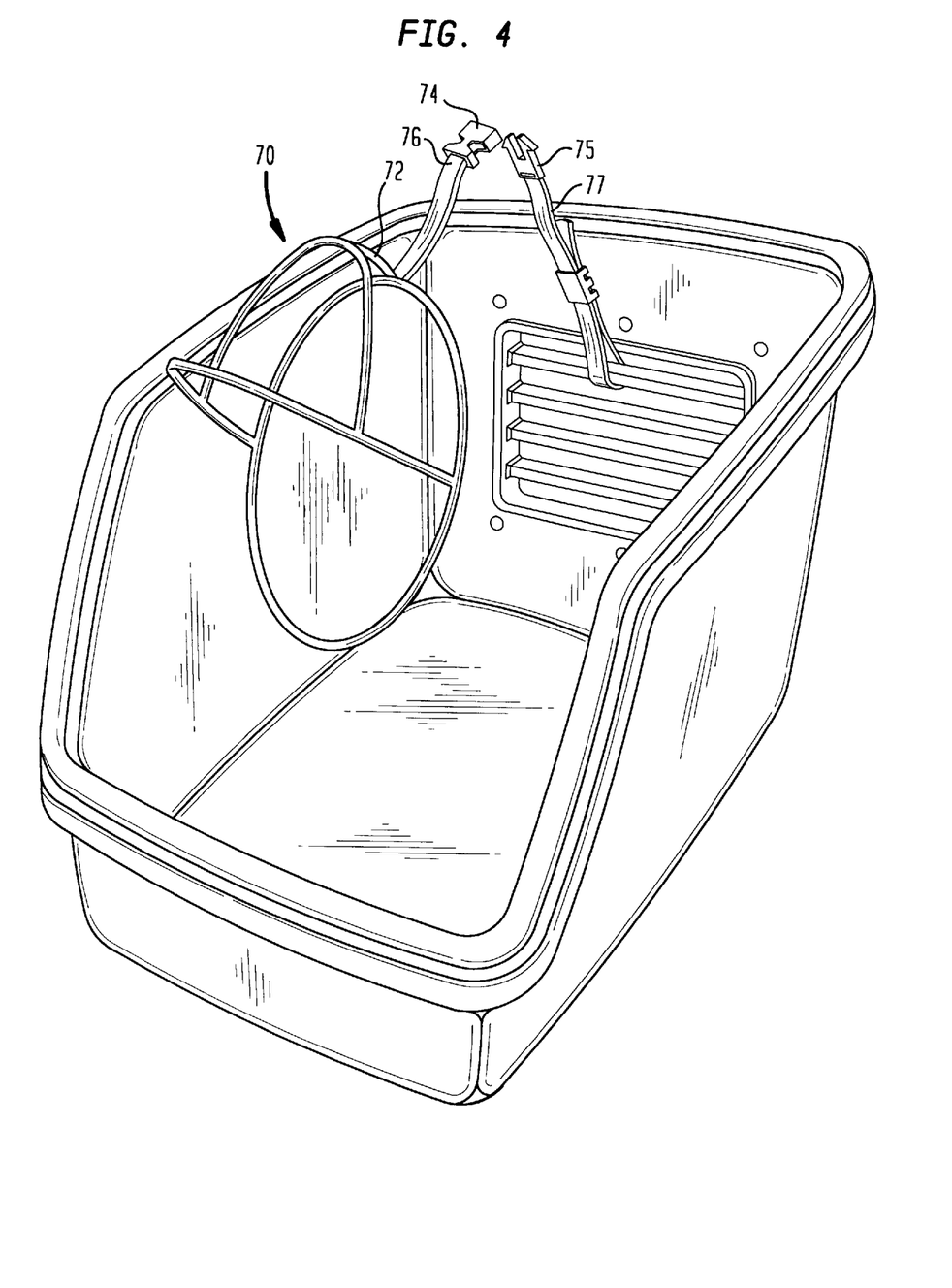
FIG. 4 is a perspective view of the pet carrier shown in FIG. 3 with a pet restraining means attached.

As shown in FIG. 4, a pet harness generally indicated at 70 has straps adapted to fit around the chest of the pet allowing the front legs of the pet to extend and has a strap 76 connected at the back of the harness between the shoulder blades of the pet, located at 72. Strap 76 is provided with a quick disconnect 74 at the other end of the strap 76. This quick disconnect will meet with the quick disconnect 75 which is connected to a secondary strap 77 connected to the traveler as will be described below.

Figure 3:
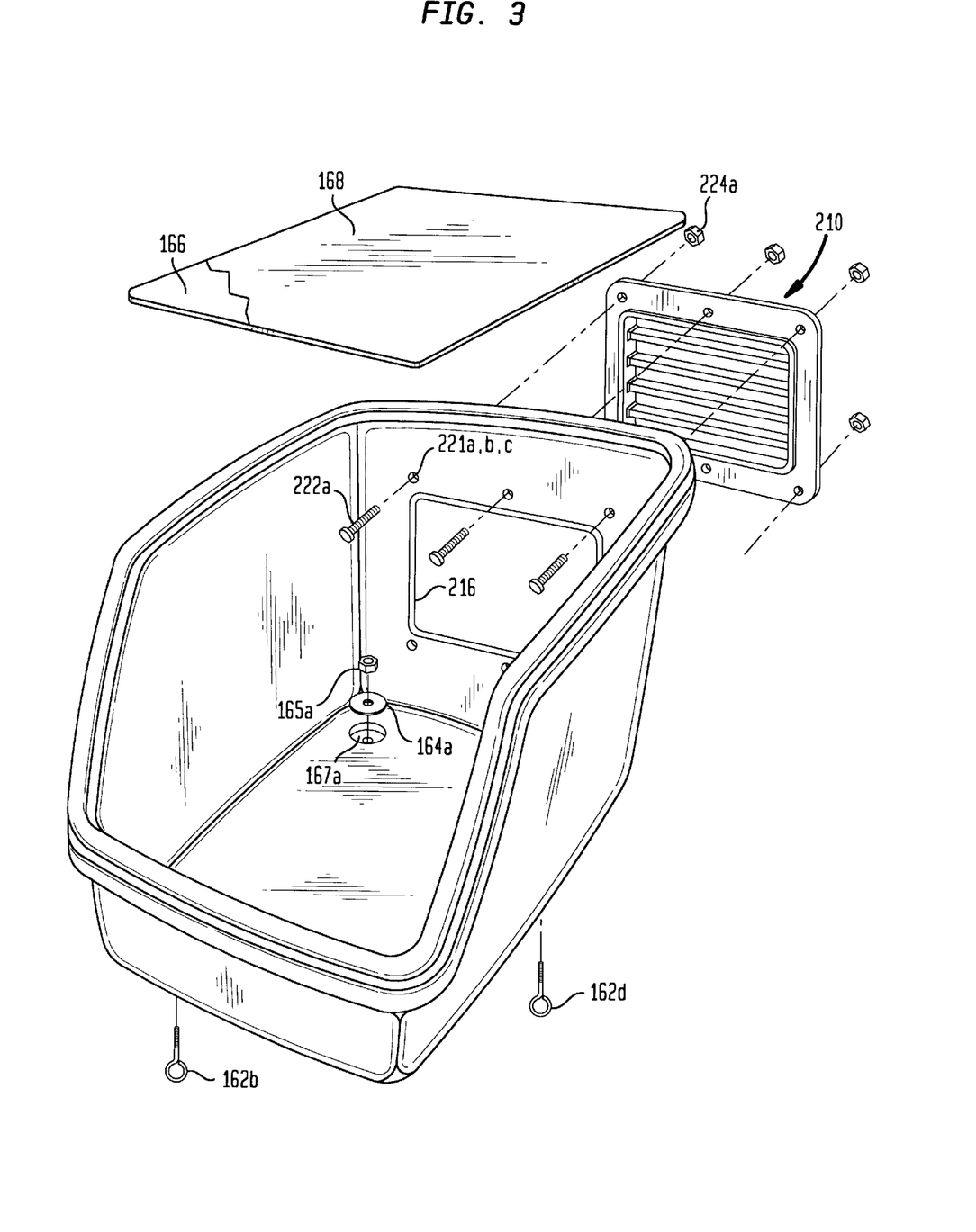
FIG. 3 is an exploded view of another embodiment of a pet carrier built in accordance with teachings of the current invention.
Figure 6:
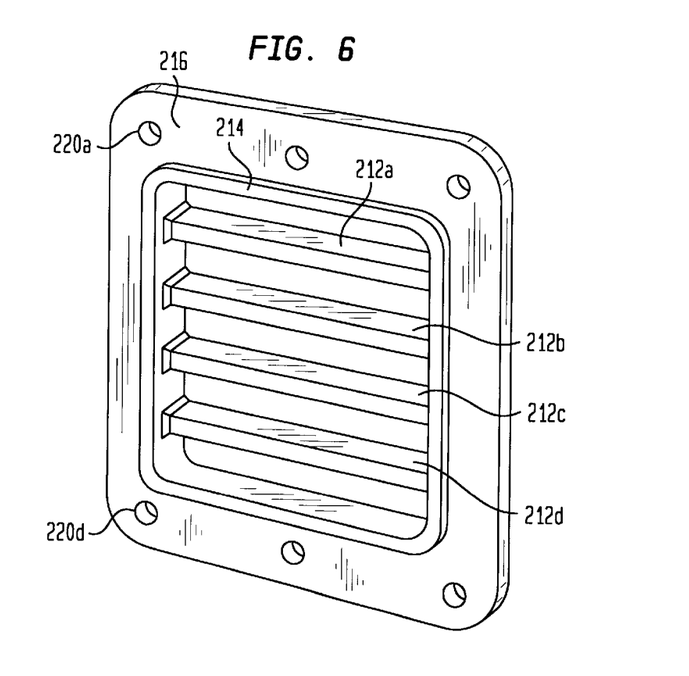
FIG. 6 is a perspective view of a part of the pet carrier shown in FIG. 3.

Referring to the embodiment shown in FIGS. 3, 4 and 6, similarly numbered parts will have similar designations with 100 added.

As shown in FIG. 3, rather than a stiffening member connected to the bottom surface, there is merely a cushion 166 at the bottom of the member with a waterproof lining 168. Additionally, as is shown, the eye bolts that are used or securing the pet carrier 162A, B, C, and D do not connect to a stiffening member but instead are connected straight to the bottom surface 122 by means of washers 164A, B, C and D respectively, and nuts 165A, B, C and D respectively, which fit into counter sunk boards 167A, B, C and D respectively in the bottom of the pet carrier.

The traveler for the embodiment shown in FIGS. 3 and 6 is generally indicated at 210 and has a plurality of horizontal bars 212A, B. C and D respectively, which are connected to a frame 214, which frame is intended to protrude through an opening in the rear wall 216. The frame 214 is formed integrally with a large flange 216, which is intended to fit behind the rear wall and is larger than the aperture 216 of the wall. The flange 216 has a plurality of bolt holes or fastening holes 220A, B, C, D, E and F respectively, which are intended to register with a plurality of holes 221A, B, C, D, E and F respectively, formed in the back wall of the pet carrier. Bolts 222A, B, C, D, E and F respectively extend through the holes in the back wall and through the flange and are secured by nuts 224A, B, C, D, E and F, respectively, to hold the flange of the traveler securely to the back wall.

Figure 7:
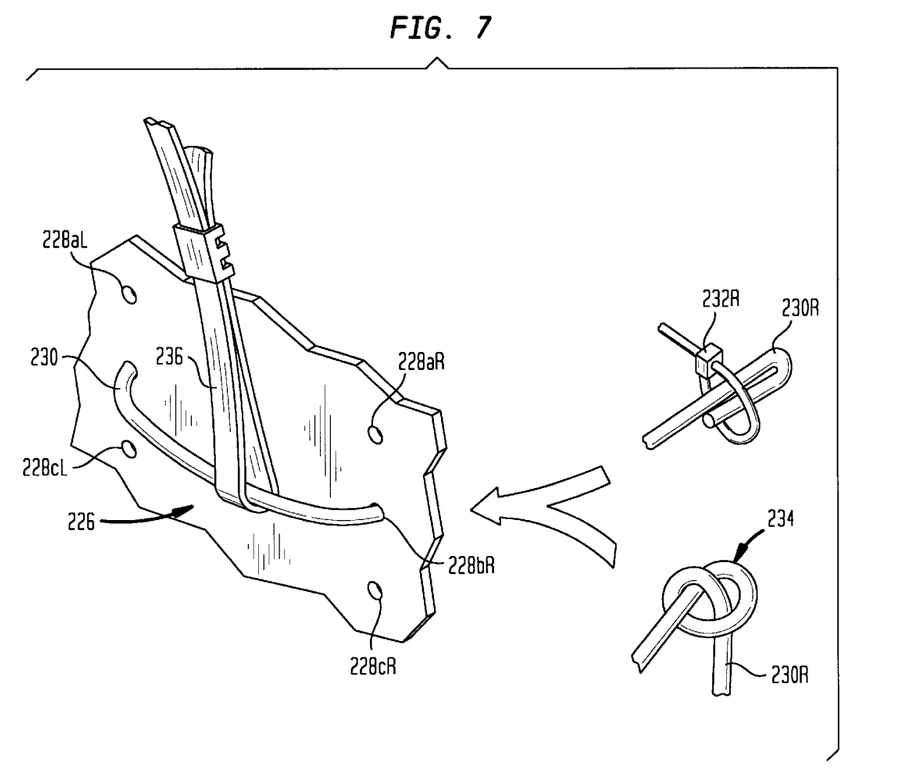
FIG. 7 is a view of a broken away portion of another embodiment or a part of a pet carrier built in accordance with the teachings of the current invention.

Referring to FIG. 7, we have a broken away section which can either be a portion of the back wall of the pet carrier or a portion of the traveler member of the type shown in FIG. 3 and 6 but having a flat surface instead of a plurality of bars. The flat surface 226 has a plurality, in this case 3 pairs of paralleled spaced holes, 228A, B and C each pair having a right and left designation. Each of the pairs is horizontally spaced and parallel to the other pairs and provides a means for passing a flexible line or cord through a pair of the holes so as to form a retaining means that will be connected to the back wall of the pet carrier to which a strap 236 can be looped or attached and be connected to the pet harness. The flexible member 230 can be a rope preferably a dacron or nylon, or a flexible steel cable which would pass through the holes and then be secured at the outside surface of the back wall by means of one way plastic tied down straps, for example as shown at 232R for the right end of the rope or cable 230 and similarly at the left end. Alternatively, the end of the rope or cable 230 could simply be knotted as at 234. Additionally, vertically aligned holes can be used to provide a single point source of attachment.

The height of the rope or other flexible retaining member is determined by the selection of the pairs of holes that will pass through and this also will be dependent upon the size of the pet being carried in the carrier.

Figure 8:
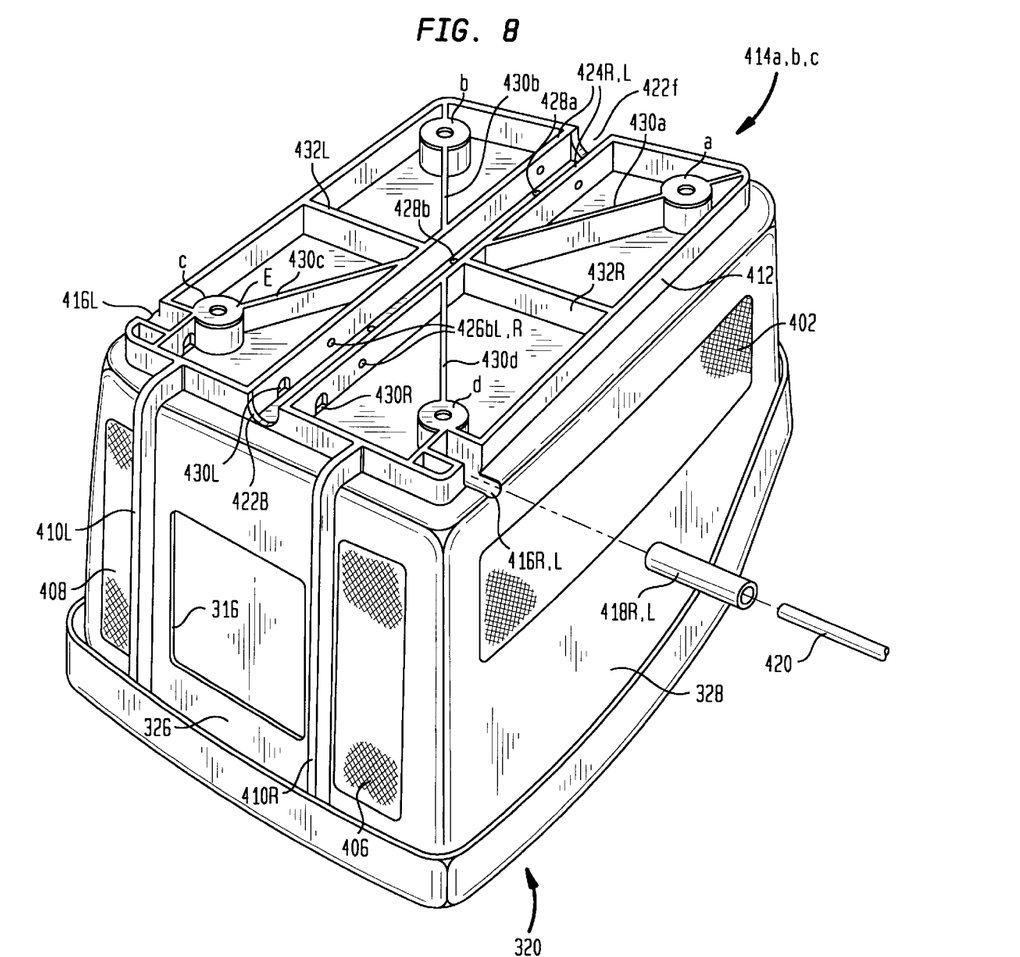
FIG. 8 is a perspective view from the top right of the pet carrier shown in FIG. 3 in the inverted position.

FIG. 8 shows the underside of a pet carrier built in accordance with the teachings of the present invention, the similar numbered items to those shown in previously discussed embodiments will be given similar designations plus 300.

The embodiment shown in FIG. 8, reflecting strips 402 are connected to the right side wall 328 and other reflecting strips are connected to the left side wall not shown. Reflecting strips 406 and 408 are mounted on the rear wall 326 outwardly from two stiffening flanges or ribs 410 right and left extending from the rear wall on either side of the aperture 316 in the rear wall for the positioning of the traveling member.

A rectangular box flange 412 extends from the bottom surface of the pet carrier to form a stiffening box. Mounting bosses 414A, B, C and D are positioned at the four corners of the bottom inside the stiffening flange. Axle recesses 416 right and left are formed at the rear of the side walls of the stiffening flange to provide for axle spacers 418 right and left respectively, which are positioned within the axle recesses to space the wheels from the side walls of the pet carrier and to act as bearings for axle 420.

Central stiffening ribs 424 right and left extend from the bottom surface of the pet carrier. The stiffening ribs extend to the front and back of the rectangular box flange and recesses 422 front and back are formed in the front and back portions of the rectangular box flange and registration with the position of the central stiffening ribs. The recesses coacting with the central stiffening ribs act to form a retainer and guide for securing a tube to the bottom of the pet carrier.

A plurality of pairs of holes 426A in the left and right central stiffening flange and 426B, left and right, can be used to pass cotter pins or any other convenient fastening means through the actual stiffening ribs and through a tube which is positioned between the central stiffening ribs with appropriate passages to receive the fastening means. Fasteners such as cotter pins, various spring pins, or picture wire can be used in order to secure the tube held within the receiver formed by the central stiffening members to the bottom of the pet carrier to secure the pet carrier to a bicycle carrier or to some wheeled towing vehicle.

It should be pointed out that while only one set of tube receptacles formed by two central stiffening flanges is shown, clearly other stiffening flanges could be provided and differently spaced to enable two tubes to be used to secure the bottom of the pet carrier to the tubes located in the tubing receptacles formed by the stiffening flanges.

In addition to the securing passages 426A and B left and right, a plurality of fastening passages 428 can be formed in between the stiffening passages to allow fasteners to be driven down from the inside of the pet carrier into any convenient receptacle. Similarly, fastening bosses 414A, B, C and D, which are used primarily to secure a stiffening member within the box can also be used to fasten down the box by means of eye bolts or other items which extend down from the mounting bosses 414A, B, C and D.

Additionally, diagonal stiffening members 430A, B, C and D are formed connecting the mounting bosses with the central stiffening members and there is also cross stiffening members 432 left and right which connect from the rectangular box flange to the central stiffening members. It should also be noted that passages 430 are formed at the rear of the central stiffening member in registration with the axle recesses to enable the axle segment 420 which is shown to pass from the right axle recess to the left axle recess to the central stiffening member.

Figure 9:
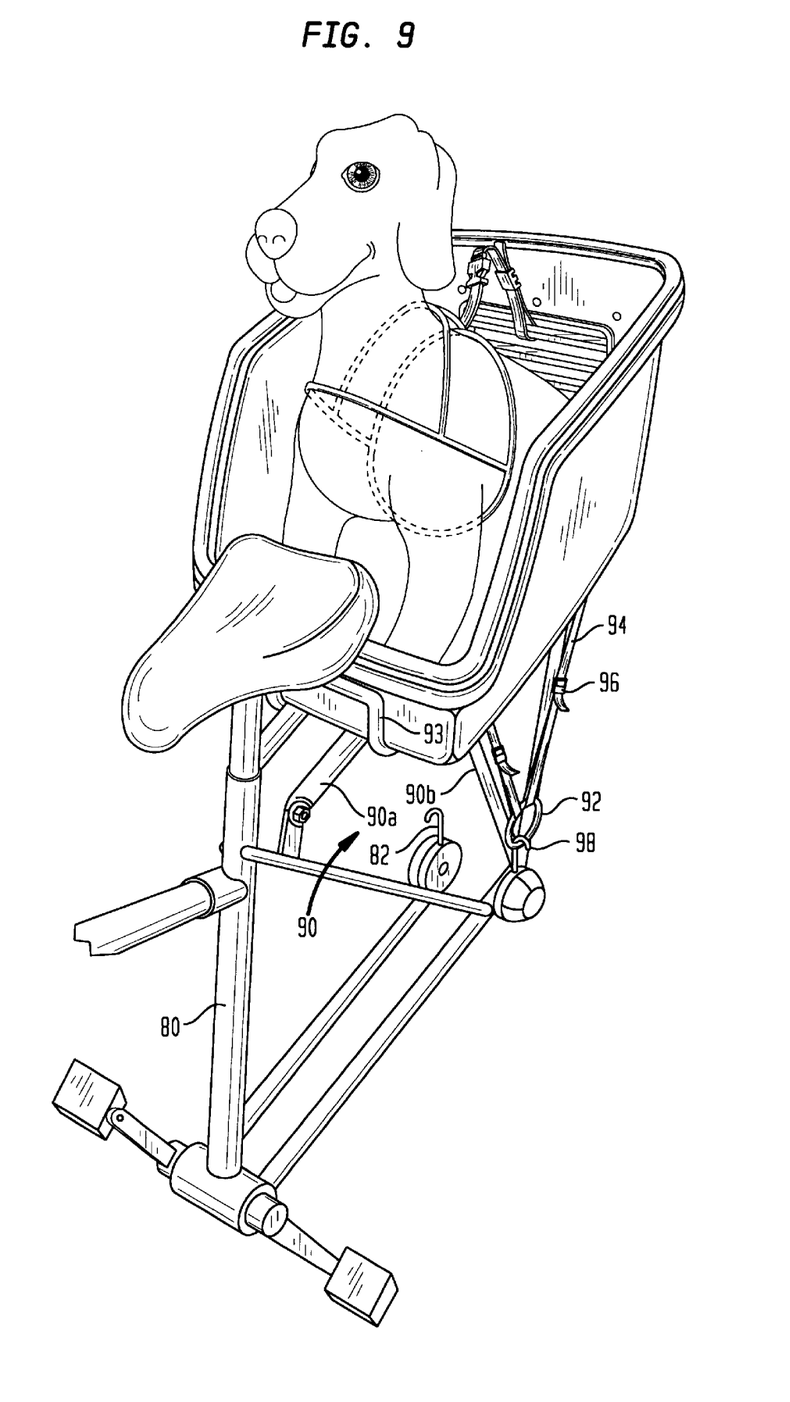
FIG. 9 is a perspective view showing the pet carrier of FIG. 2 mounted to the frame of a bicycle.

Referring to FIG. 9 we see the pet carrier mounted to a bicycle generally indicated at 80. The bicycle has a series of auxiliary hooks generally indicated at 98 mounted to the rear axle assembly portion of the bicycle generally indicated at 82. The bicycle has a carrier 90 which includes horizontal members 90A and truss members 90B that extend down from the carrier to mount on the rear axle assembly area 82. The mounting of the carrier is by conventional means. The carrier is secured on top of the tubular members, in this case two, which are shown as 90*a* and is also fastened to the axle assembly 82 by a pair of descending straps 94, on each side of the carrier, having adjusting buckles 96 which are connected to a mounting ring 92 that is engaged by hooks 98 extending from the rear axle assembly.

In this position, the pet is safely held within the pet carrier behind the rider of the bicycle. The straps 94 can be elastic or non flexible such as nylon. The tubes from the carrier can be the tubes normally had for a spring type opening by carrier or for a special carrier that would be built to accommodate the underside of the pet carrier, previously described.

Figure 10:
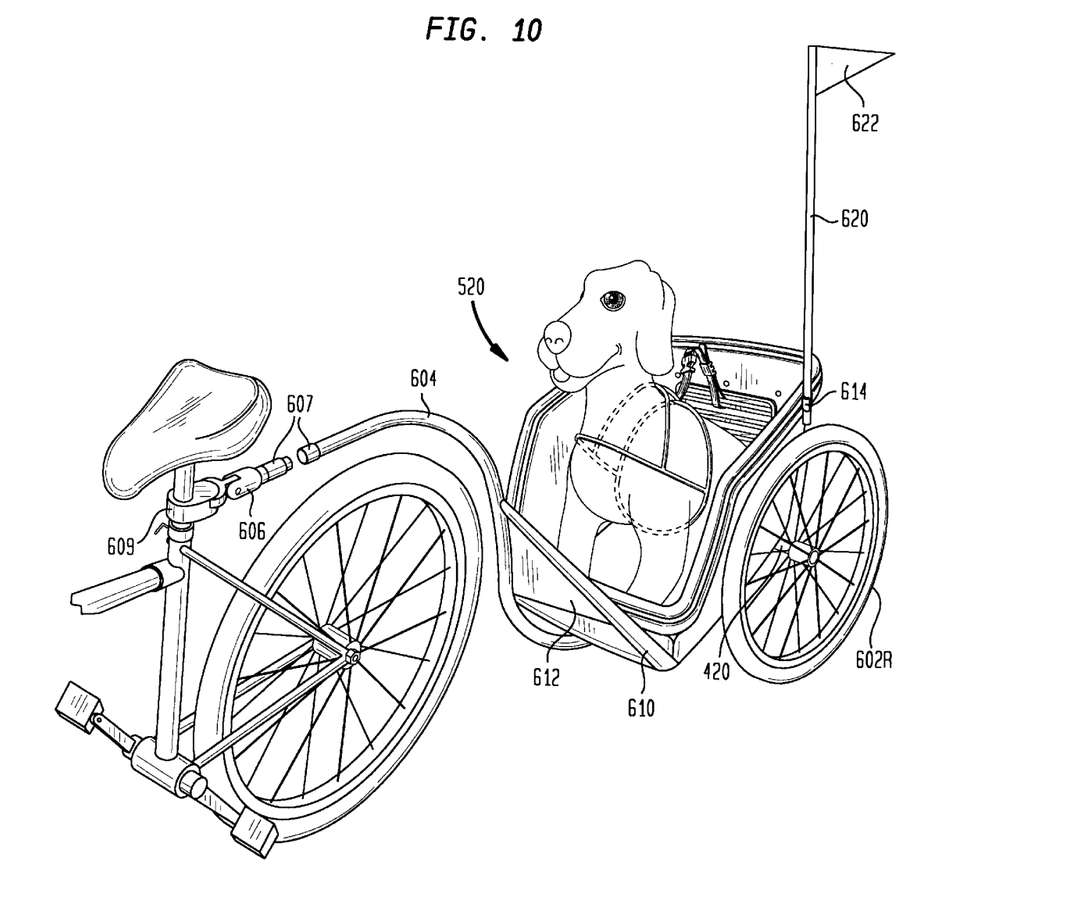
FIG. 10 is a perspective view of another embodiment of a pet carrier connected to be towed behind a bicycle.

As shown in FIG. 10 the pet carrier generally indicated 520 can be mounted on wheels 602 which are connected to the pet carrier by means of axles 420. The pet carrier is connected to the bicycle by means of a puller bar 604 which can be mounted to the central tubular receptacle of the type described in FIG. 8. At the end of the puller bar 604 is a quick disconnect fitting 607 which can be used to quickly remove the pet carrier from the frame of the bicycle. Additionally, the fitting can have a universal movement 606. Also, a standard collar could be used, which can then be easily removed by removing the seat part 609. Many seat parts have quick adjustment fittings which allow the seat part to be removed relatively effortlessly and quickly. Many such devices are well known both those specifically designed for bicycles and others such as those used for connecting garden hoses and the like.

A pulling frame generally indicated at 610 has two arms extending from the sides or bottom of the pet carrier and connected to the pulling bar. A mud guard 612 is formed between the arms to shield the pet in the pet carrier from mud splashed up from the wheel.

The rear of the pet carrier has a flag holder 614 in which a pole 620 carrying a flag 622 can be mounted or safety precautions.

Figure 11:
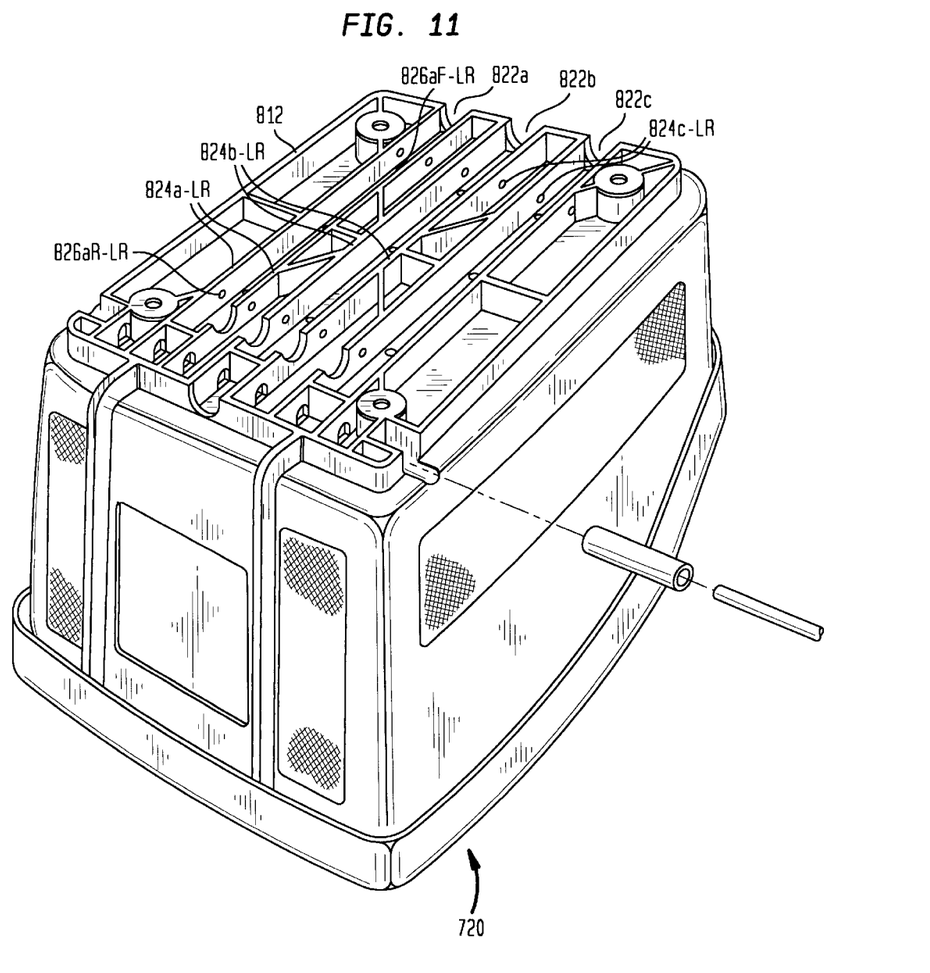
FIG. 11 is a view similar to FIG. 8 showing a modified construction of the pet carrier.

FIG. 11 shows a pet carrier similar to that shown in FIG. 8, generally indicated at 720, having side walls and all other similar parts that are shown in FIG. 8 but increased from 300 and 400 to 700 and 800.

The bottom of the pet carrier, however, has three sets of central stiffening flange ribs, namely 824A, B and C, each of which have a right and left section. Each of the pairs of central stiffening flanges which form the tube receptacle have, however, only one recess which will be in the front of the rectangular box flange stiffening surface 812. These recesses being indicated at 822A, B and C similarly as shown in FIG. 8. Fastening holes 826 are provided so as shown the passes and the stiffening members 824 left and right will be 826AR for rear left and right and 826AF for front left and right.

The three tube receptacles offer enhanced flexibility for mounting of the pet carrier. The central receptacle 824B formed by the parallel channels 824B left and right can be used to mount the pet carrier in the way shown in FIG. 10. The outer two receptacles 824A and C can be used to coact with a two tube carrier as shown in FIG. 9, or all three receptacles A, B and C can be used to coact with a special bike carrier as shown in FIG. 12.

Figure 12:
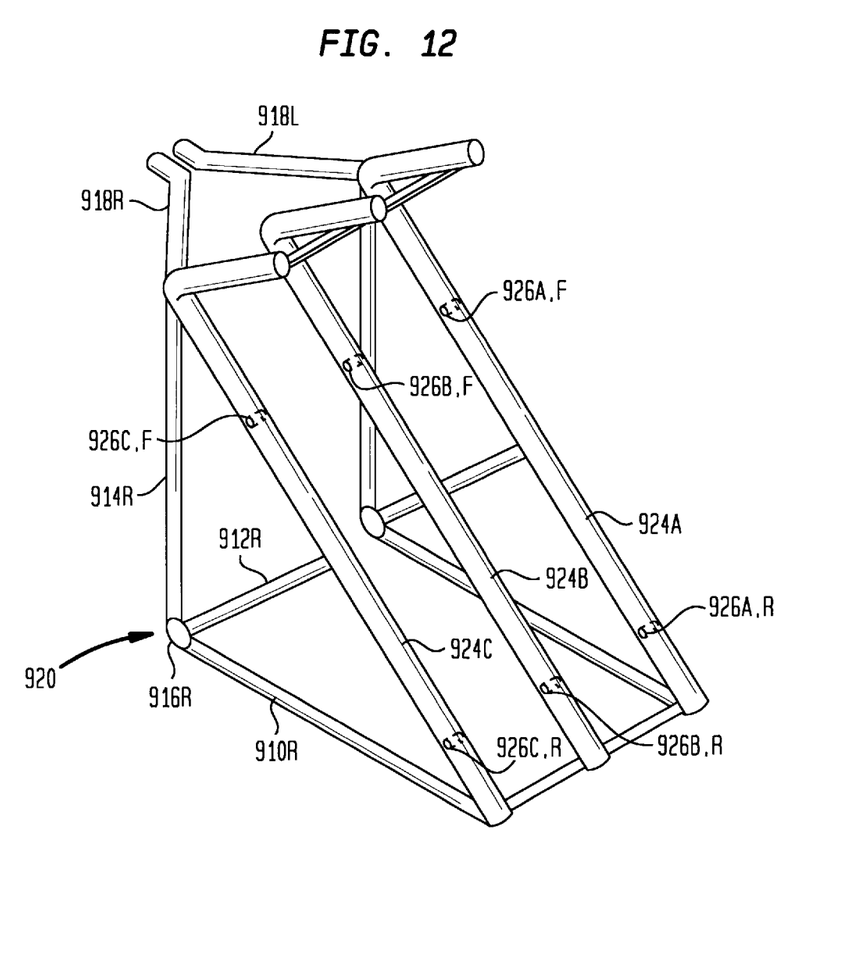
FIG. 12 is a schematic view of a bicycle carrier rack adapted to be used in conjunction with the embodiment of the invention shown in FIG. 11 and 8.

The three tube carrier shown in FIG. 12 is generally indicated at 920, and has a truss network 910, 912 and 914 on either side intended to support the carrier portion and connect to the rear axle at the junction 91of the three truss members. Truss members 914 have members 918 left and right, which are adapted to be connected to the frame of the bicycle to work in conjunction with the axle connection to support the carrier frame. The top of the frame has three support tubes, 924A, B and C which are designed to register with the tube receptacles 824A, B and C of the carrier. Additionally, fastening passages 926A, B and C rear and forward corresponding to the passages 826 in the bottom of the pet carrier shown in FIG. 11, are also provided to enable passage of a convenient fastening means such as a cotter pin or a spring retaining pin or even nuts and bolts to hold the pet carrier securely onto the bicycle carrier.

It will be understood that the embodiments described herein are merely exemplary and that a person skilled in the art may make many variations and modifications without departing from the sphere and scope of the invention. All such variations and modifications are intended to be included in the scope of the invention as defined in the appended claims.

What is claimed is:

1. A carrier for transporting and restraining pets having a harness or collar, said carrier adapted to be removably attached to a bicycle frame, comprising:

an open-topped box-like container having a bottom surface, a front wall member, a rear wall member and two side wall members defining a compartment interiorly of said wall members and bottom surface for supporting said pet, an elongated securing member disposed on a wall member of said compartment, said elongated securing member spaced therefrom along its length and extending therealong the wall member, flexible restraining means for securing said pet to said carrier, said flexible restraining means comprising flexible band means adapted to be secured to a pet and first clasp means having a front end and a back end, said back end of said first clasp means connected to said flexible band, and said front end of said first clasp means removably engaging said elongated securing member for sliding movement therealong when attached to said pet harness.

2. The carrier of claim 1 wherein said elongated securing member comprises:

a bar extending from one of the wall members of said carrier.

3. The carrier of claim 1 wherein said elongated securing member comprises:

a flexible member extending along a wall member of said carrier.

4. The carrier of claim 1 wherein said container comprises:

at least one slot extending along one wall member of said carrier and operatively associated with the elongated securing member.

5. The carrier of claim 1 wherein said flexible restraining means includes:

elastic means of adjustable length.

6. The carrier of claim 1 wherein said first clasp means comprises:

a spring hasp having a leaf.

7. The carrier of claim 1 further comprising:

means adapted for removable engagement of the carrier with a bicycle.

8. The carrier according to claim 1 wherein the elongated securing member comprises:

a plurality of elongated rods for providing a plurality of attachment points for the front end of said first clasp means.

9. An apparatus for transporting a pet or animal in association with a bicycle or the like comprising:

a carrier frame connected to the bicycle the carrier frame comprising:
axle means connected to the bottom of the pet carrier;
wheels connected to the axle means; and
puller means connected to the pet carrier and to the frame of the bicycle;
tubular fastening means disposed on the top of the carrier frame;
means connecting the tubular fastening means to the frame of the bicycle;
a pet carrier having:
a bottom wall, side walls and front and back walls;
tubular receptacle means formed in the bottom of the pet carrier;
means to fasten the pet carrier to the carrier frame;
means to secure the pet within the pet carrier comprising:
a traveler member connected to and extending along the back wall of the pet carrier and being spaced apart from the back wall, and
fastening means adapted to be connected to a harness means for the pet and slidingly engaged with the traveler member to enable securing of the pet in the pet carrier with the ability for limited movement of the pet within the pet carrier.

10. The apparatus according to claim 9 further comprising:

shield means mounted on the puller means to shield the pet from debris and water thrown from the bicycle wheel toward the pet carrying compartment of the pet carrier.

11. The apparatus according to claim 9 wherein the carrier frame comprises:

a carrier rack adapted to fit over the rear wheel of a bicycle;
truss tubing extending from the carrier rack and mounted to the rear axle assembly of the bicycle; and
means connecting the pet carrier to the carrier rack.

12. The apparatus according to claim 11 wherein the connecting means comprises:

at least one tube on said carrier rack extending substantially parallel to the plane of the rear wheel;
at least one tubular receptacle means disposed on the bottom of said pet carrier adapted to receive said tube on said carrier rack; and p1 means to fasten said pet carrier directly to at least one of said bicycle frame and said tube on said carrier rack.

13. The apparatus according to claim 9 wherein the tubular receptacle means comprises:

at least one pair of parallel stiffening flanges;
said stiffening flanges constructed and arranged to coact as a tubular receptacle; and
said stiffening flanges having securing passages formed therein, said passages coacting to allow passing of fastening means through the securing passages to secure a tube within the tubular receptacle means.

14. The apparatus according to claim 13 further comprising:

a box like stiffening flange extending from the bottom of the pet carrier; and
passage means in the front of the box like stiffening member in registration with the tubular receptacle.

15. The apparatus according to claim 9 wherein the traveler member comprises:

a plurality of rails fastened to the back wall of the pet carrier in substantially parallel relationship.

16. The apparatus according to claim 9 wherein the traveler member comprises:

a plurality of horizontal parallel members connected to a frame forming a grid;
the grid frame connected to a flange;
the back wall of the pet carrier having an aperture adapted to receive the grid frame;
the flange of the traveler member larger than the aperture and disposed outside of the back wall of the pet carrier; and
means securing the flange of the traveler member to the back wall of the pet carrier and positioning the traveler member to enable the grid frame to extend into the pet carrier.

17. The apparatus according to claim 9 wherein the traveler member comprises:

a plurality of apertures formed in the back wall of the pet carrier to form a series of passages for mounting a securing member along the back wall;
flexible retaining means passing through selected apertures to form a securing member along the back wall of the pet carrier; and means to secure the flexible retaining means in position on the back wall of the pet carrier.

18. The apparatus according to claim 9 wherein the fastening means comprises a double latching means.

19. The apparatus according to claim 9 wherein the connecting means further comprises:

universal joint means to allow for relative angular displacement between the bicycle and the pet carrier; and quick disconnect means operatively associated with the connecting means to enable rapid and easy separation of the pet carrier from the bicycle.

20. An apparatus for transporting a pet in association with a bicycle or the like comprising:

a carrier frame connected to the bicycle;

tubular fastening means disposed on the top of the carrier frame;

means connecting the tubular fastening means to the frame of the bicycle;

wherein the carrier frame comprises:
  a carrier rack adapted to fit over the rear wheel of a bicycle;
  truss tubing extending from the carrier rack and mounted to the rear axle assembly of the bicycle;
  means for connecting a pet carrier to the carrier rack comprising:
   at least one tube on said carrier rack extending substantially parallel to the plane of the rear wheel;
   at least one tubular receptacle means disposed on the bottom of said pet carrier adapted to receive said tube on said carrier rack;
   means to fasten said pet carrier directly to at least one of said bicycle frame and said tube on said carrier rack;

a pet carrier having:
  a bottom wall, side walls and front and back walls;
  means to fasten the pet carrier to the carrier frame comprising:
   tubular receptacle means formed in the bottom of the pet carrier, the tubular receptacle means comprising:
    at least one pair of parallel stiffening flanges;
    said stiffening flanges constructed and arranged to coact as a tubular receptacle;
    said stiffening flanges having securing passages formed therein, said passages coacting to allow passing of fastening means through the securing passages to secure a tube within the tubular receptacle means in the pet carrier;
    a box like stiffening flange extending from the bottom of the pet carrier;
    passage means in the front of the box like stiffening member in registration with the tubular receptacle stiffening members;

means to secure the pet within the pet carrier comprising:
  connecting means connected to the rear wall of the frame;
  harness means adapted to fit securely about the front shoulders of a pet; and
  fastening means connect to the harness means and slidingly engaged with the traveler member to enable securing of the pet in the pet carrier with the ability for limited movement of the pet within the pet carrier.

21. An apparatus for transporting a pet or animal in association with a bicycle or the like comprising:

a carrier frame connected to the bicycle, the carrier frame comprising:
  axle means connected to the bottom of the pet carrier, wheels connected to the axle means,
  puller means connected to the pet carrier and to the frame of the bicycle;

tubular fastening means disposed on the top of the carrier frame;

means connecting the tubular fastening means to the frame of the bicycle;

a pet carrier having:
  a bottom wall, side walls and front and back walls;
  tubular receptacle means formed in the bottom of the pet carrier;
  means to fasten the pet carrier to the carrier frame;
  means to secure the pet within the pet carrier, comprising
   a traveler member connected to the back wall of the pet carrier and extending therefrom in a spaced relation along a substantial portion of the back wall, and
   fastening means adapted to be connected to a harness means for the pet and slidingly engaged with the traveler member to enable securing of the pet in the pet carrier with the ability for limited movement of the pet within the pet carrier.

22. The apparatus according to claim 21 wherein the tubular receptacle means comprises:

at least one pair of parallel stiffening flanges;

said stiffening flanges constructed and arranged to coact as a tubular receptacle;

said stiffening flanges having securing passages formed therein; and said passages coacting to allow fastening of fastening means through the securing passages to secure a tube within the tubular receptacle means.

* * * * *